UNITED STATES PATENT OFFICE.

WILLIAM EDGAR MUNTZ, OF LONDON, ENGLAND.

PNEUMATIC TIRE.

1,110,640.  Specification of Letters Patent.  Patented Sept. 15, 1914.

No Drawing.  Application filed December 23, 1912.  Serial No. 738,357.

*To all whom it may concern:*

Be it known that I, WILLIAM EDGAR MUNTZ, a subject of the King of Great Britain, and resident of the Royal Automobile Club, 89 to 91 Pall Mall, London, England, late of His Majesty's Public Works Department, India, have invented new and useful Improvements Relating to Pneumatic Tires, of which the following is a specification.

Pneumatic tires for motor cars and other vehicles or the covers for the air tubes comprised in the same or the air tubes themselves are composed of vulcanized rubber and a lining or reinforcement of fabric of fibrous material.

It is found in practice that tires as at present manufactured are far from durable and the lining material is liable to give way after comparatively little wear.

I have traced the weakness of the material to influence on the fiber employed of the vulcanizing operation which has a tendency to weaken the fiber and to the great heat generated in running at a high rate of speed which also has a damaging effect on the lining or reinforcing material as at present constituted.

I have found that I am able to produce a more durable tire by employing as a lining or reinforcing material a fabric manufactured from a fibrous substance not influenced by the agencies above referred to, which agencies now react prejudicially on the strength and durability of existing tires. Such a substance, is silk in its natural state which is very strong and elastic, of long fiber and easily woven into a fabric suitable for embedding in rubber or for lining the same in the manufacture of tires.

Hitherto the fabric or cord of pneumatic outer covers has been made of cotton or other cellulose fiber, generally of the finest Sea Island or Egyptian cotton, selected for its good quality and strength. Silk in its ordinary manufactured state after it has been treated to remove the gum which it naturally contains may have been tried experimentally but it could not be successfully used being too brittle and not sufficiently strong.

According to my present invention I use silk in its natural state without its gum being removed. It is then extremely strong and not brittle and the operations usual in preparing raw silk for the market not having been performed the cost of the article is to that extent reduced. Silk from the wild silk worm, which has, I believe, only recently been capable of manufacture is very suitable for my purpose. A fabric woven from the spun thread of the silk worm without the treating and dressing usual to remove the gum and make the material suitable for the market has three times the strength of a cotton fabric of the same weight.

The advantage in elasticity implies also great advantages in resiliency and for heavy vehicles where twin tires are now employed to get sufficient supporting power without destroying resiliency altogether, as would be the case with a single cotton made tire of sufficient strength, a single silk tire made according to my invention will fulfill every requirement. Reference has already been made to the liability which there is for the cotton in tires to become decomposed by the chemical action and heat set up in vulcanization and in running. All cellulose is decomposed especially when in a confined space, and loses its strength at about 212° F. or even less, whereas silk is unaffected under 400° F. As a matter of actual experiment a single yarn of the present Sea Island fabric has a breaking strain of 18 lbs. which after an exposure of 60 minutes to a temperature equivalent to 40 lbs. steam pressure diminishes to 13 lbs., whereas a silk yarn of the same bulk underwent no deterioration in strength whatever on being exposed to a temperature of 300° F. The heat developed in running, frequently long continued, is often high, also during vulcanization where a steam pressure of say 40 lbs is employed,— it is about 280° F. The temperature and chemical effect of vulcanization which are extremely prejudicial to cellulose do not affect silk. The latter moreover is not so liable to rot from the presence of damp.

All silks, as above mentioned, are treated and dressed to improve their appearance for the market, which operations, however, are destructive to the qualities which render silk desirable for use in the manufacture of pneumatic tires.

What I claim and desire to secure by Letters Patent of the United States is:—

A wheel tire having a foundation fabric consisting of natural silk incorporated with india rubber of usual formation, substantially as described.

In testimony whereof I have signed my name to this specification in the presence of two subscribing witnesses.

WILLIAM EDGAR MUNTZ.

Witnesses:
P. A. NEWTON,
ALFRED S. BISHOP.